Figure 1:
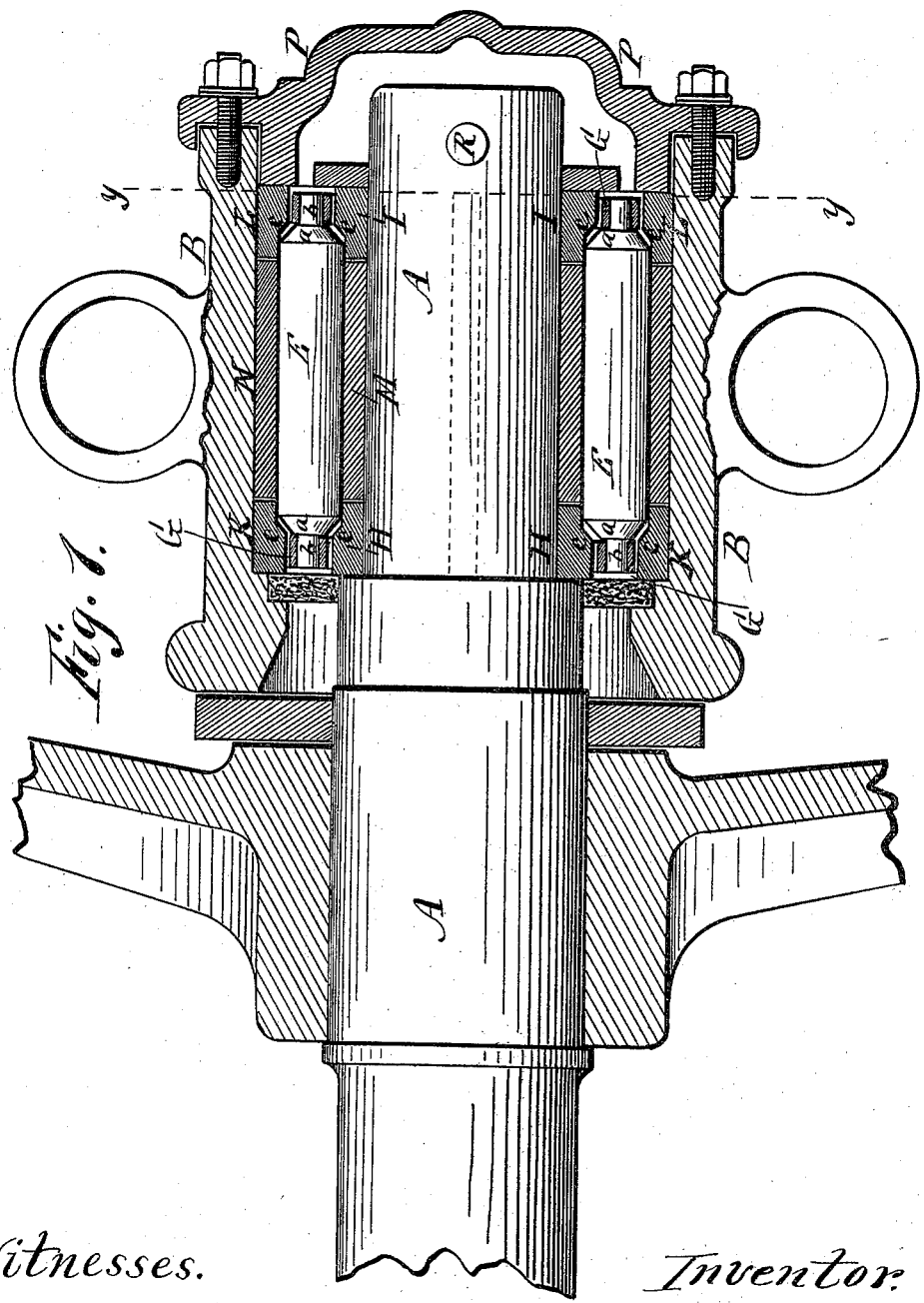

(No Model.) 2 Sheets—Sheet 1.

H. B. WILLIAMS.
JOURNAL BOX.

No. 526,336. Patented Sept. 18, 1894.

Witnesses.
Chauncey Perry
F. S. Hutchinson.

Inventor.
Henry B. Williams,
pr R. F. Osgood,
Atty.

(No Model.) 2 Sheets—Sheet 2.
H. B. WILLIAMS.
JOURNAL BOX.
No. 526,336. Patented Sept. 18, 1894.
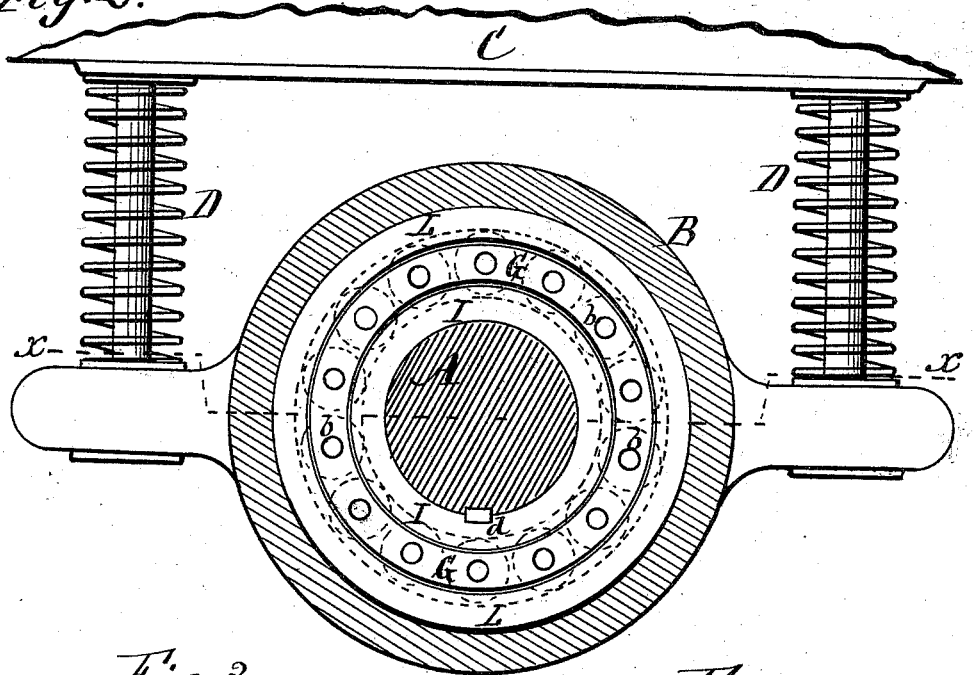
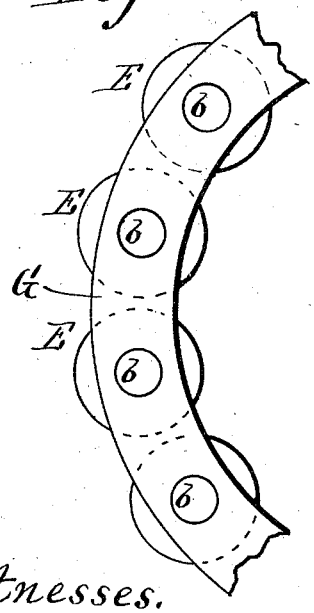
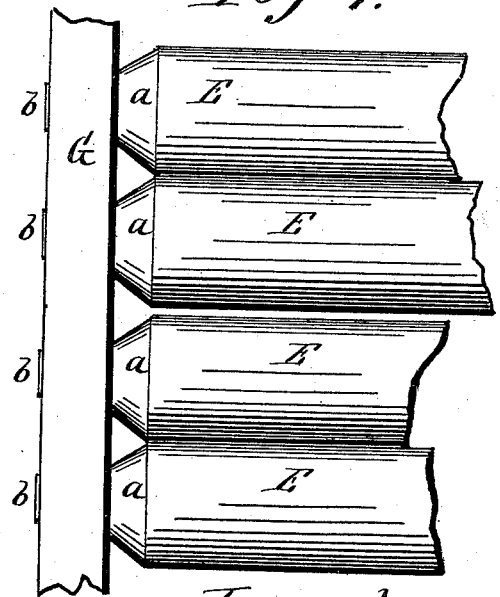
Witnesses.
Chauncey Perry
F. S. Hutchinson.
Inventor.
Henry B. Williams,
per R. F. Osgood.
Atty.

UNITED STATES PATENT OFFICE.

HENRY B. WILLIAMS, OF ROCHESTER, NEW YORK, ASSIGNOR OF ONE-HALF TO LEMUEL A. JEFFREYS, OF SAME PLACE.

JOURNAL-BOX.

SPECIFICATION forming part of Letters Patent No. 526,336, dated September 18, 1894.

Application filed November 7, 1893. Serial No. 490,312. (No model.)

*To all whom it may concern:*

Be it known that I, HENRY B. WILLIAMS, of Rochester, in the county of Monroe and State of New York, have invented a certain new and useful Improvement in Journal-Boxes, of which the following is a specification.

My improvement relates to the journal boxes of railroad cars, particularly street cars.

It also relates to that class in which conical ended friction rollers journaled in rings are used inside the box.

The invention consists in the construction and arrangement of parts hereinafter described and claimed.

In the drawings—Figure 1 is a horizontal section of the box, in line $x\ x$ of Fig. 2. Fig. 2 is a vertical cross section in line $y\ y$ of Fig. 1. Figs. 3 and 4 are enlarged elevations at right angles to each other, of a part of the friction rollers and the ring that supports them.

A indicates the axle and B the case of the box, the latter supporting the car body C by means of the ordinary springs D D.

E E E are a set of friction rollers surrounding the axle. They have conical ends $a\ a$, which rest against the tubular bearings hereinafter described; also short journals $b\ b$, which rest in and are supported by rings G G that rest loosely in the case of the box around the axle. These rings hold the rollers in position and prevent them from twisting and cramping.

H and I are two tubular bearings which are slipped endwise on to the axle, being located at opposite ends of the box; and K and L are corresponding bearings which are slipped endwise into the case in the same manner, and located also at opposite ends of the box, in coincidence with the bearings of the axle. The inner edges of all four of these bearings are beveled, as shown at $c\ c\ c\ c$, forming seats to receive the conical ends of the rollers above described. The rings G G, which hold the rollers, are located outside the bevels and rest between the bearings of the case and axle, being closely confined, but having free movement.

M and N are loose sleeves, one on the axle and the other in the case, serving as separators to keep the tubular bearings apart, and also as surfaces to receive the contact of the rollers on opposite sides. The sleeves, as well as the tubular bearings, are independent of the axle and case, and like them are removable endwise through the case for repairs or otherwise.

The beveled seats $c\ c$ of the tubular bearings are set in from the inner edges of said bearings, as shown in Fig. 1, leaving thereby plain bearing surfaces at the inner edges of the bearings over which the plain ends of the rollers lap, and the bearing surfaces of the sleeves lie in the same plane with these inner edges, by which means the rollers cover the joints between the bearings and sleeves and make a true fit, and prevent loose action which might occur if the rollers bore on the sleeves alone. The beveled seats serve to receive the end thrust of the rollers and relieve friction.

The bearings and sleeve on the axle are secured against independent rotation by a key $d$ fitting in a groove half in the axle and half in the bearings and sleeve, as shown in Fig. 2. The bearings and sleeve of the case are held in place by a cap P secured on the outer end of the case, and those of the axle by a pin R inserted crosswise through the axle.

Friction rollers provided with conical ends and attached to rings have before been used in journal boxes. Removable bushings are also known. Such I do not broadly claim.

What I claim as new, and desire to secure by Letters Patent, is—

In a journal box, the combination of the case, the axle, a set of conical-ended friction rollers surrounding the axle, rings in which the rollers are journaled, two removable tubular bearings with beveled seats at each end of the box, one contacting with the axle, the other with the case, a sleeve interposed between the bearings on the axle and another between the bearings in the case the contact surfaces of the sleeves and bearings being in the same plane and the sleeves being of less length than the rollers, whereby the rollers overlap the joints between the sleeves and bearings, as and for the purpose specified.

In witness whereof I have hereunto signed my name in the presence of two subscribing witnesses.

HENRY B. WILLIAMS.

Witnesses:
R. F. OSGOOD,
A. W. WILBUR.